(12) United States Patent
Iwasaki

(10) Patent No.: US 11,348,463 B2
(45) Date of Patent: May 31, 2022

(54) TRAVEL CONTROL DEVICE, TRAVEL CONTROL METHOD, AND STORAGE MEDIUM STORING PROGRAM

(71) Applicant: HONDA MOTOR CO., LTD., Tokyo (JP)

(72) Inventor: Shun Iwasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 293 days.

(21) Appl. No.: 16/718,899

(22) Filed: Dec. 18, 2019

(65) Prior Publication Data

US 2020/0226927 A1 Jul. 16, 2020

(30) Foreign Application Priority Data

Jan. 15, 2019 (JP) .............................. JP2019-004604

(51) Int. Cl.
*G08G 1/16* (2006.01)
*B60W 10/04* (2006.01)
(Continued)

(52) U.S. Cl.
CPC ............. *G08G 1/161* (2013.01); *B60W 10/04* (2013.01); *B60W 10/18* (2013.01);
(Continued)

(58) Field of Classification Search
CPC .. B60W 10/04; B60W 10/18; B60W 2420/42; B60W 2520/10; B60W 2530/00; B60W 2552/05; B60W 2552/53; B60W 2554/4023; B60W 2554/4041; B60W 2554/4044; B60W 2554/4045; B60W 2554/801; B60W 2554/802; B60W 2556/50; B60W 2556/65; B60W 2710/18; B60W 2720/10; B60W 2720/106;
(Continued)

(56) References Cited

U.S. PATENT DOCUMENTS 10,635,844 B1 * 4/2020 Roose ...................... G06F 30/20
2006/0009910 A1 * 1/2006 Ewerhart ............... B60W 30/16
701/301

(Continued)

FOREIGN PATENT DOCUMENTS

JP 2018-101403 A 6/2018

*Primary Examiner* — Babar Sarwar
(74) *Attorney, Agent, or Firm* — Thomas | Horstemeyer, LLP

(57) ABSTRACT

A travel control device comprising: a control unit configured to control travel of a vehicle; a first acquisition unit configured to acquire information regarding the surroundings of the vehicle; and a second acquisition unit configured to acquire vehicle information regarding another vehicle traveling in the same direction as the vehicle in a different lane from the lane that the vehicle is traveling in with at least a part of the other vehicle forward of the vehicle, the vehicle information regarding the other vehicle being included in the information regarding the surroundings of the vehicle acquired by the first acquisition unit, wherein, if the vehicle information regarding the other vehicle fulfills a condition, the control unit, in accordance with a state of approach of the vehicle to the other vehicle, performs control so that the vehicle decelerates.

22 Claims, 11 Drawing Sheets

(51) Int. Cl.
   *B60W 10/18*   (2012.01)
   *G06V 20/58*   (2022.01)
   *G06V 20/56*   (2022.01)

(52) U.S. Cl.
   CPC .......... *G06V 20/584* (2022.01); *G06V 20/588* (2022.01); *G08G 1/166* (2013.01); *B60W 2420/42* (2013.01); *B60W 2530/00* (2013.01); *B60W 2552/05* (2020.02); *B60W 2552/53* (2020.02); *B60W 2554/4041* (2020.02); *B60W 2554/4044* (2020.02); *B60W 2556/65* (2020.02); *B60W 2710/18* (2013.01); *B60W 2720/10* (2013.01); *B60W 2720/106* (2013.01)

(58) Field of Classification Search
   CPC ........................... B60W 30/09; B60W 30/143; G06K 9/00798; G06K 9/00805; G06K 9/00825; G06K 9/00845; G08G 1/161; G08G 1/163; G08G 1/166; G08G 1/167
   See application file for complete search history.

(56) References Cited

U.S. PATENT DOCUMENTS

| | | | |
|---|---|---|---|
| 2010/0295668 A1* | 11/2010 | Kataoka | B62D 15/025 340/435 |
| 2013/0013164 A1* | 1/2013 | Taguchi | B60W 50/0097 701/96 |
| 2015/0073663 A1* | 3/2015 | Nilsson | B60W 50/0098 701/41 |
| 2016/0082971 A1* | 3/2016 | Fuehrer | B60W 50/14 701/48 |
| 2016/0146618 A1* | 5/2016 | Caveney | B60W 50/14 701/25 |
| 2016/0362105 A1* | 12/2016 | Kwon | G01C 21/26 |
| 2018/0012496 A1* | 1/2018 | Hasberg | B60W 30/18163 |
| 2018/0114441 A1* | 4/2018 | Marmet | G01S 19/48 |
| 2018/0170370 A1* | 6/2018 | Kataoka | B60W 30/12 |
| 2018/0201272 A1* | 7/2018 | Takeda | B60W 10/184 |
| 2019/0232942 A1* | 8/2019 | Liu | B60W 20/19 |
| 2020/0148214 A1* | 5/2020 | Tamagaki | B60W 30/14 |
| 2020/0307597 A1* | 10/2020 | Oka | B60W 30/162 |

\* cited by examiner

TRAVEL CONTROL DEVICE, TRAVEL CONTROL METHOD, AND STORAGE MEDIUM STORING PROGRAM

CROSS-REFERENCE TO RELATED APPLICATION(S)

This application claims priority to and the benefit of Japanese Patent Application No. 2019-004604 filed on Jan. 15, 2019, the entire disclosure of which is incorporated herein by reference.

BACKGROUND OF THE INVENTION

Field of the Invention

The present invention relates to a travel control device, a travel control method, and a storage medium storing a program for controlling travel of a vehicle.

Description of the Related Art

During automated driving and assisted driving, travel of a self-vehicle is controlled in accordance with other vehicles present in the surrounding area of the self-vehicle. Japanese Patent Laid-Open No. 2018-101403 discloses that, in the presence of a target object for which it is estimated that the self-vehicle will make a steering operation in a direction to avoid an object, the target travel line is changed in the direction of the steering operation and assistance is provided such that the self-vehicle travels along the changed target travel line.

The other vehicles may be vehicles having relatively long travel-direction vehicle lengths, such as trucks, and such vehicles, when making a right or left turn, tend to temporarily swing in the direction opposite the direction of the turn they are making. In a case in which the self-vehicle is traveling rearward of such another vehicle in an adjacent lane, the other vehicle may intrude into the lane that the self-vehicle is in in order to make a right or left turn.

SUMMARY OF THE INVENTION

The present invention provides a travel control device, a travel control method, and a storage medium storing a program for avoiding risks brought about by another vehicle intruding into the lane that the self-vehicle is in.

A travel control device according to the present invention includes: a control unit configured to control travel of a vehicle; a first acquisition unit configured to acquire information regarding the surroundings of the vehicle; and a second acquisition unit configured to acquire vehicle information regarding another vehicle traveling in the same direction as the vehicle in a different lane from the lane that the vehicle is traveling in with at least a part of the other vehicle forward of the vehicle, the vehicle information regarding the other vehicle being included in the information regarding the surroundings of the vehicle acquired by the first acquisition unit, wherein if the vehicle information regarding the other vehicle fulfills a condition, the control unit, in accordance with a state of approach of the vehicle to the other vehicle, performs control so that the vehicle decelerates.

A travel control device according to the present invention includes: a control unit configured to control travel of a vehicle; a first acquisition unit configured to acquire information regarding the surroundings of the vehicle; and a second acquisition unit configured to acquire vehicle information regarding another vehicle traveling in the same direction as the vehicle in a different lane from the lane that the vehicle is traveling in with at least a part of the other vehicle forward of the vehicle if it is determined based on the information regarding the surroundings of the vehicle that the vehicle is approaching a specific scene, the vehicle information regarding the other vehicle being included in the information regarding the surroundings of the vehicle acquired by the first acquisition unit, wherein if the vehicle information regarding the other vehicle fulfills a condition, the control unit performs control so that the vehicle decelerates.

A travel control device according to the present invention includes: a control unit configured to control travel of a vehicle; a first acquisition unit configured to acquire information regarding the surroundings of the vehicle; a second acquisition unit configured to acquire vehicle information regarding another vehicle traveling in the same direction as the vehicle in a different lane from the lane that the vehicle is traveling in with at least a part of the other vehicle forward of the vehicle, the vehicle information regarding the other vehicle being included in the information regarding the surroundings of the vehicle acquired by the first acquisition unit; and a recognition unit configured to perform recognition with respect to an image of the other vehicle, wherein if the vehicle information regarding the other vehicle fulfills a condition, the control unit, based on the result of the recognition by the recognition unit, performs control so that the vehicle performs deceleration.

According to the present invention, risks brought about by another vehicle intruding into the lane that the self-vehicle is in can be avoided.

DESCRIPTION OF THE EMBODIMENT

Figure 1:
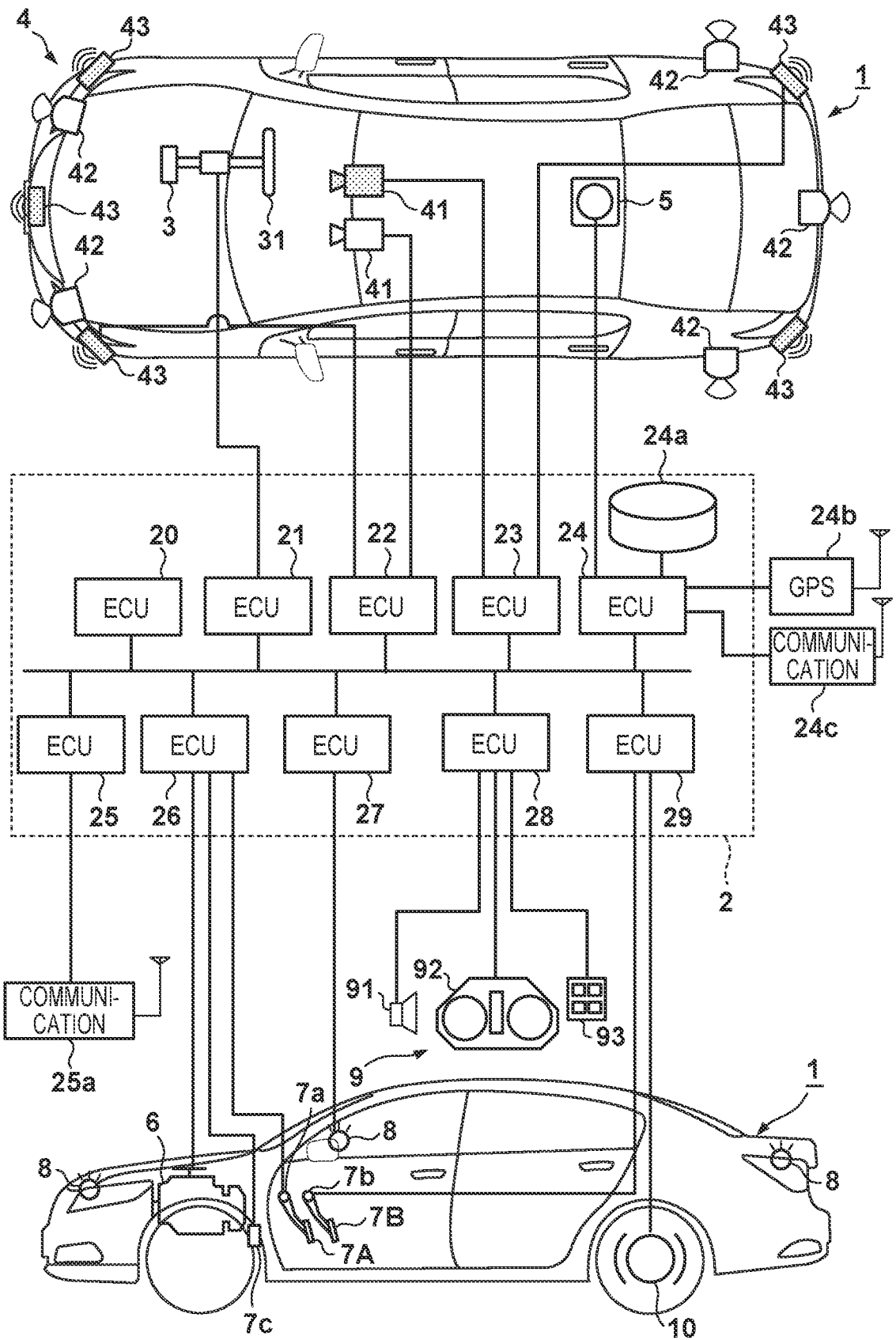
FIG. 1 is a diagram illustrating a configuration of a vehicle control device.

Hereinafter, an embodiment will be described in detail with reference to the attached drawings. Note that the following embodiment is not intended to limit the scope of the claimed invention, and limitation is not made to an invention that requires all combinations of features described in the embodiment. Two or more of the multiple features described in the embodiment may be combined as appropriate. Furthermore, the same reference numerals are given to the same or similar configurations, and redundant description thereof is omitted.

FIG. 1 is a block diagram of a vehicle control device (travel control device) according to one embodiment of the present invention, and the vehicle control device controls a vehicle 1. In FIG. 1, the vehicle 1 is schematically illustrated in both plan view and side view. As one example, the vehicle 1 is a four-wheel sedan-type passenger car.

The control device in FIG. 1 includes a control unit 2. The control unit 2 includes a plurality of ECUs 20 to 29 that are communicatably connected to each other by an in-vehicle network. Each ECU includes a processor that is typified by a CPU, a storage device such as a semiconductor memory, an interface with an external device, etc. Programs executed by the processor, data used by the processor for processing, etc., are stored in the storage device. Each ECU may include a plurality of processors, storage devices, interfaces, etc. Furthermore, the configuration of the control device in FIG. 1 may constitute a computer implementing the present invention according to a program.

In the following, the function that each of the ECUs 20 to 29 is in charge of, etc., will be described. Note that the number of ECUs and the functions that the ECUs are in charge of can be designed as appropriate, and can be further segmented or further integrated than disclosed in the present embodiment.

The ECU 20 executes control relating to automated driving of the vehicle 1. During automated driving, at least one of the steering and the acceleration/deceleration of the vehicle 1 is automatically controlled. In the control example described later, both steering and acceleration/deceleration are automatically controlled.

The ECU 21 controls an electric power steering device 3. The electric power steering device 3 includes a mechanism that steers the front wheels in accordance with a driving operation (steering operation) made by the driver to a steering wheel 31. Furthermore, the electric power steering device 3 includes a motor that generates a driving force for assisting the steering operation or for automatically steering the front wheels, a sensor that detects the steering angle, etc. If the driving state of the vehicle 1 is an automated driving state, the ECU 21 automatically controls the electric power steering device 3 in response to instructions from the ECU 20 and controls the travel direction of the vehicle 1.

The ECUs 22 and 23 perform control of detection units 41 to 43 that detect the surrounding conditions of the vehicle and perform information processing of detection results of the detection units 41 to 43. The detection units 41 are cameras (sometimes referred to as cameras 41 in the following) that take images of an area forward of the vehicle 1. In the case of the present embodiment, the detection units 41 are attached to a front part of a roof of the vehicle 1 on the vehicle-compartment inner side of a windshield. By analyzing images taken by the cameras 41, the outlines of targets and lane markings (white lines, etc.) on a road can be extracted.

The detection units 42 are light detection and ranging (LIDAR) units, and detect targets around the vehicle 1 and measure the distance to the targets. In the case of the present embodiment, five detection units 42 are provided, one at each corner of the front part of the vehicle 1, one at the center of the rear part of the vehicle 1, and one on each lateral side of the rear part of the vehicle 1. The detection units 43 are millimeter wave radars (sometimes referred to as radars 43 in the following), and detect targets in the surrounding region of the vehicle 1 and measure the distance to the targets. In the case of the present embodiment, five radars 43 are provided, one at the center of the front part of the vehicle 1, one at each corner of the front part of the vehicle 1, and one at each corner of the rear part of the vehicle 1.

The ECU 22 performs control of one of the cameras 41 and each detection unit 42 and performs information processing of detection results of one of the cameras 41 and each detection unit 42. The ECU 23 performs control of the other one of the cameras 41 and each radar 43 and performs information processing of detection results of the other one of the cameras 41 and each radar 43. As a result of providing two sets of devices for detecting the surrounding conditions of the vehicle, the reliability of detection results can be improved, and as a result of providing detection units of different types, such as cameras and radars, the surrounding environment of the vehicle can be analyzed from many sides.

The ECU 24 performs control of and information processing of detection results or communication results of a gyro sensor 5, a GPS sensor 24b, and a communication device 24c. The gyro sensor 5 detects the rotational movement of the vehicle 1. The course of the vehicle 1 can be determined based on the detection results of the gyro sensor 5, the wheel speed, etc. The GPS sensor 24b detects the current position of the vehicle 1. The communication device 24c wirelessly communicates with a server that provides map information and traffic information and acquires such information. The ECU 24 can access a map information database 24a constructed in a storage device, and performs a route search from the current location to the destination, etc.

The ECU 25 includes a communication device 25a for inter-vehicular communication. The communication device 25a wirelessly communicates with other vehicles in the surrounding region and exchanges information between the vehicles.

The ECU 26 controls a power plant 6. The power plant 6 is a mechanism that outputs a driving force for rotating the driving wheels of the vehicle 1, and includes an engine and a transmission, for example. For example, the ECU 26 controls the output of the engine in response to a driving operation (accelerator operation or acceleration operation) made by the driver, detected by an operation-detecting sensor 7a that an accelerator pedal 7A is provided with, or changes the gear range of the transmission based on information such as the vehicle speed detected by a vehicle speed sensor 7c. If the driving state of the vehicle 1 is an automated driving state, the ECU 26 automatically controls the power plant 6 as per instructions from the ECU 20 and controls the acceleration/deceleration of the vehicle 1.

The ECU 27 controls lighting devices (headlamps, tail lamps, etc.) including direction indicators 8 (blinkers). In the case of the example in FIG. 1, the direction indicators 8 are provided on the front part, the door mirrors, and the rear part of the vehicle 1.

The ECU 28 controls an input/output device 9. The input/output device 9 outputs information to the driver and receives input of information from the driver. An audio output device 91 notifies the driver of information using audio. A display device 92 notifies the driver of information by displaying images. For example, the display device 92 is arranged in front of the driver's seat and constitutes an instrument panel, etc. Note that, while audio and display are mentioned as examples here, a notification regarding information may be made by using vibration and light. Further, a notification regarding information may be made by using a combination of two or more out of audio, display, vibration, and light. Furthermore, the combination may be changed or the form of notification may be changed in accordance with the level (urgency, for example) of the information for which a notification is to be made. Furthermore, the display device 92 includes a navigation device.

An input device 93 is a group of switches that are arranged at a position at which the switches can be operated by the driver and are for providing instructions to the vehicle 1. However, an audio input device may also be included in the input device 93.

The ECU 29 controls a brake device 10 and a parking brake (unillustrated). For example, the brake device 10 is a disc brake device, is provided in each wheel of the vehicle 1, and decelerates or stops the vehicle 1 by applying resistance to the rotation of the wheel. For example, the ECU 29 controls the actuation of the brake device 10 in response to a driving operation (brake operation) made by the driver, detected by an operation-detecting sensor 7b that a brake pedal 7B is provided with. If the driving state of the vehicle 1 is an automated driving state, the ECU 29 automatically controls the brake device 10 in response to instructions from the ECU 20 and controls the deceleration and stopping of the vehicle 1. The brake device 10 and the parking brake can be actuated in order to keep the vehicle 1 in a stopped state. Furthermore, if the transmission in the power plant 6 includes a parking lock mechanism, the parking lock mechanism can be actuated to keep the vehicle 1 in a stopped state.

Control Example

Control relating to the automated driving of the vehicle 1, executed by the ECU 20, will be described. When a destination and automated driving are designated by the driver, the ECU 20, in accordance with a guidance route found through a search performed by the ECU 24, automatically controls the vehicle 1 so that the vehicle 1 travels toward the destination. In the automatic control, the ECU 20 acquires information (surroundings information) regarding the surrounding conditions of the vehicle 1 from the ECUs 22 and 23, and controls the steering and the acceleration/deceleration of the vehicle 1 by providing instructions to the ECUs 21, 26, and 29 based on the acquired information.

Figure 2:
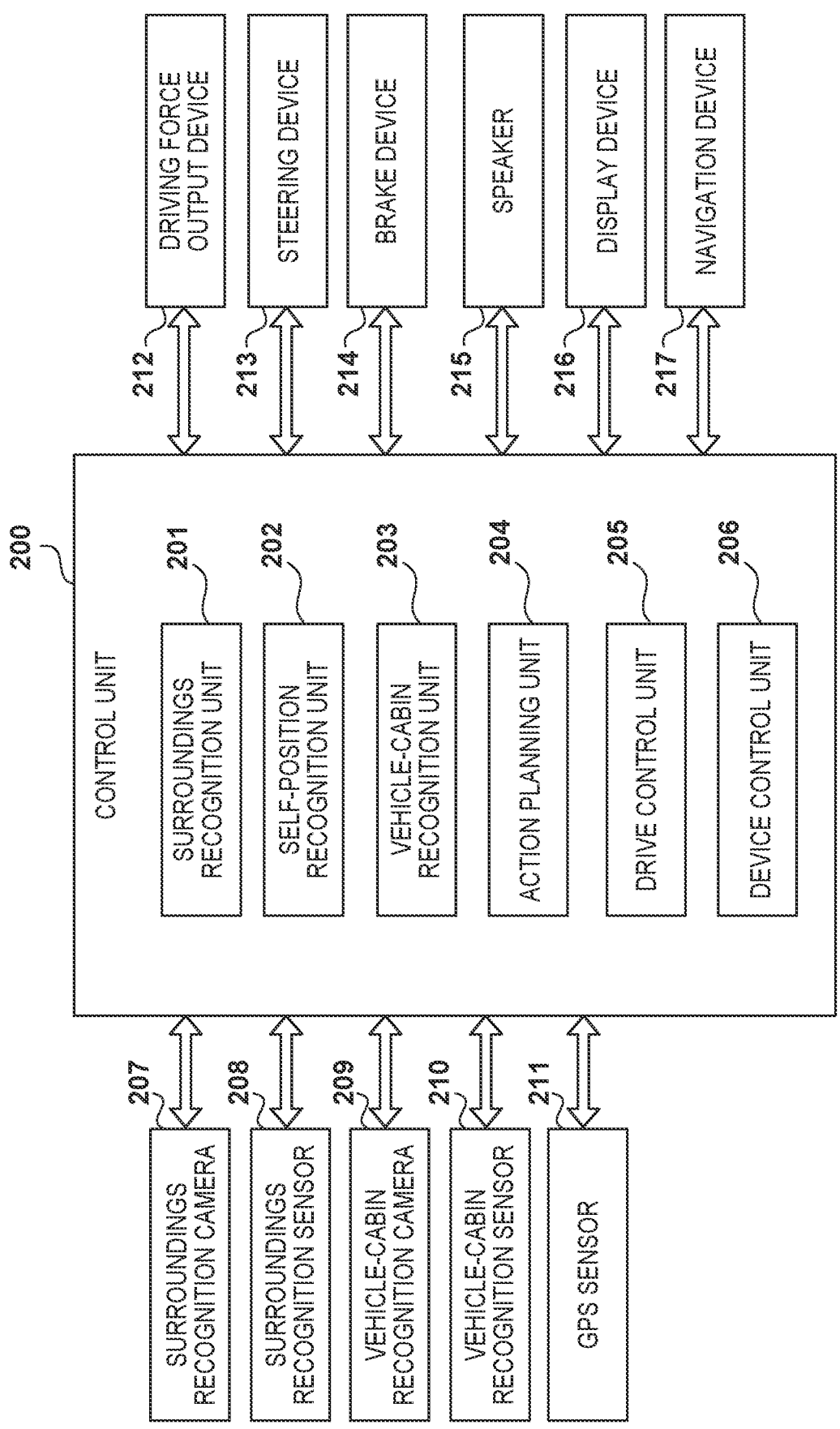
FIG. 2 is a diagram illustrating functional blocks of a control unit.

FIG. 2 is a diagram illustrating functional blocks of the control unit 2. A controller 200 corresponds to the control unit 2 shown in FIG. 1, and includes a surroundings recognition unit 201, a self-position recognition unit 202, a vehicle-cabin recognition unit 203, an action planning unit 204, a drive control unit 205, and a device control unit 206. Each block is realized by one of or a plurality of the ECUs illustrated in FIG. 1.

The surroundings recognition unit 201 performs recognition of surroundings information regarding the vehicle 1 based on signals from surroundings recognition cameras 207 and surroundings recognition sensors 208. Here, the surroundings recognition cameras 207 are the cameras 41 in FIG. 1, for example, and the surroundings recognition sensors 208 are the detection units 42 and 43 in FIG. 1, for example. For example, based on signals from the surroundings recognition cameras 207 and the surroundings recognition sensors 208, the surroundings recognition unit 201 recognizes scenes such as intersections and railway crossings, open spaces such as road shoulders, and the behavior (the speed and the travel direction) of other vehicles. The self-position recognition unit 202 recognizes the current position of the vehicle 1 based on a signal from a GPS sensor 211. Here, the GPS sensor 211 corresponds to the GPS sensor 24b in FIG. 1, for example.

The vehicle-cabin recognition unit 203, based on signals from a vehicle-cabin recognition camera 209 and a vehicle-cabin recognition sensor 210, identifies a person in the vehicle 1 and recognizes the state of the person on board the vehicle 1. For example, the vehicle-cabin recognition camera 209 is a near-infrared camera installed on the display device 92 inside the vehicle 1, and detects the direction of the line of sight of the person on board the vehicle, for example. Furthermore, the vehicle-cabin recognition sensor 210 is a sensor that detects a biological signal of the person on board the vehicle, for example. Based on signals from the vehicle-cabin recognition camera 209 and the vehicle-cabin recognition sensor 210, the vehicle-cabin recognition unit 203 can recognize that a person on board the vehicle has dozed off, that a person on board the vehicle is involved in a task other than driving, etc.

The action planning unit 204 creates action plans for the vehicle 1, such as an optimum route and a risk-avoiding route, based on the results of recognition by the surroundings recognition unit 201 and the self-position recognition unit 202. For example, the action planning unit 204 determines whether or not to enter an intersection, a railway crossing, or the like based on the start point and end point, and plans an action based on a prediction of the behavior of other vehicles. The drive control unit 205 controls a driving force output device 212, a steering device 213, and a brake device 214 based on an action planned by the action planning unit 204. Here, for example, the driving force output device 212 corresponds to the power plant 6 in FIG. 1, the steering device 213 corresponds to the electric power steering device 3 in FIG. 1, and the brake device 214 corresponds to the brake device 10.

The device control unit 206 controls devices connected to the controller 200. For example, the device control unit 206 controls a speaker 215 and causes the speaker 215 to output predetermined voice messages, such as messages for navigation and warnings. Furthermore, the device control unit 206 controls a display device 216 and causes the display device 216 to display a predetermined interface screen, for example. For example, the display device 216 corresponds to the display device 92. Furthermore, the device control unit 206 controls a navigation device 217 and acquires information regarding settings made on the navigation device 217, for example.

The controller 200 may include functional blocks other than those illustrated in FIG. 2. For example, the controller 200 may include an optimum route calculation unit that calculates the optimum route to a destination based on the map information acquired via the communication device 24c. Further, the controller 200 may acquire information from devices other than the cameras and sensors illustrated in FIG. 2. For example, the controller 200 may be configured to acquire information regarding other vehicles via the communication device 25a.

Here, travel control of the vehicle 1 in the present embodiment will be described with reference to FIG. 3. Self-vehicles 301 and 303 in FIG. 3 correspond to the vehicle 1 in FIG. 1. Other vehicles 302 and 304 are other vehicles traveling in the same direction as the self-vehicles 301 and 303 in a different lane from the self-vehicles 301 and 303. In the present embodiment, the other vehicles 302 and 304 are large-sized vehicles, such as a truck or a bus, having a travel-direction total vehicle length of a predetermined length or longer.

Figure 3:
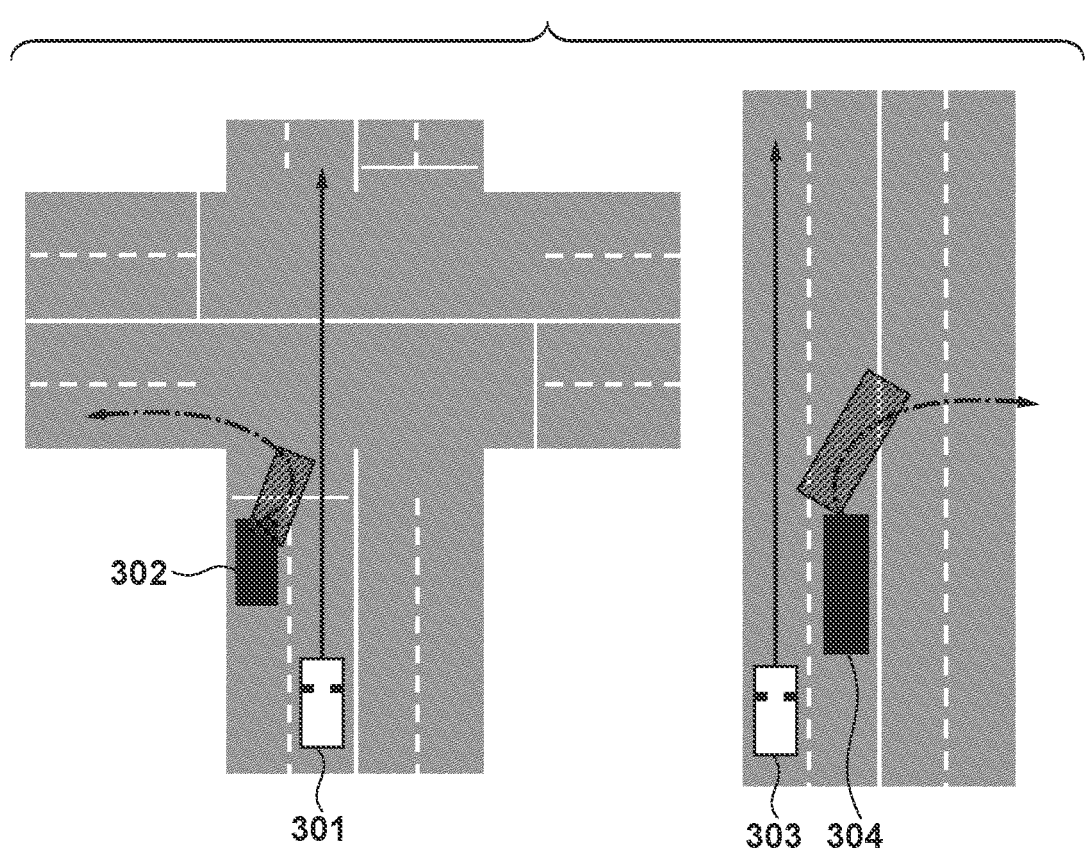
FIG. 3 is a diagram for describing travel control of a vehicle.

The left side of FIG. 3 shows a scene in which the other vehicle 302 is making a left turn at an intersection, and the right side of FIG. 3 shows a scene in which the other vehicle 304 is making a right turn. If the other vehicles 302 and 304 are large-sized vehicles, it is highly likely that the other vehicles 302 and 304, when making right and left turns, will intrude into the lanes that the self-vehicles 301 and 303 are in due to a temporary swing in traveling paths in the direction opposite the direction of the turn they are making. In the present embodiment, if the other vehicles 302 and 304 are large-sized vehicles, the self-vehicles 301 and 303 thus plan actions taking the above-described likelihood into consideration. As a result of this, hard braking, etc., that would otherwise be performed when the other vehicles 302 and 304 intrude into the lanes that the self-vehicles 301 and 303 are in can be prevented, and safety can be improved.

Figure 4:
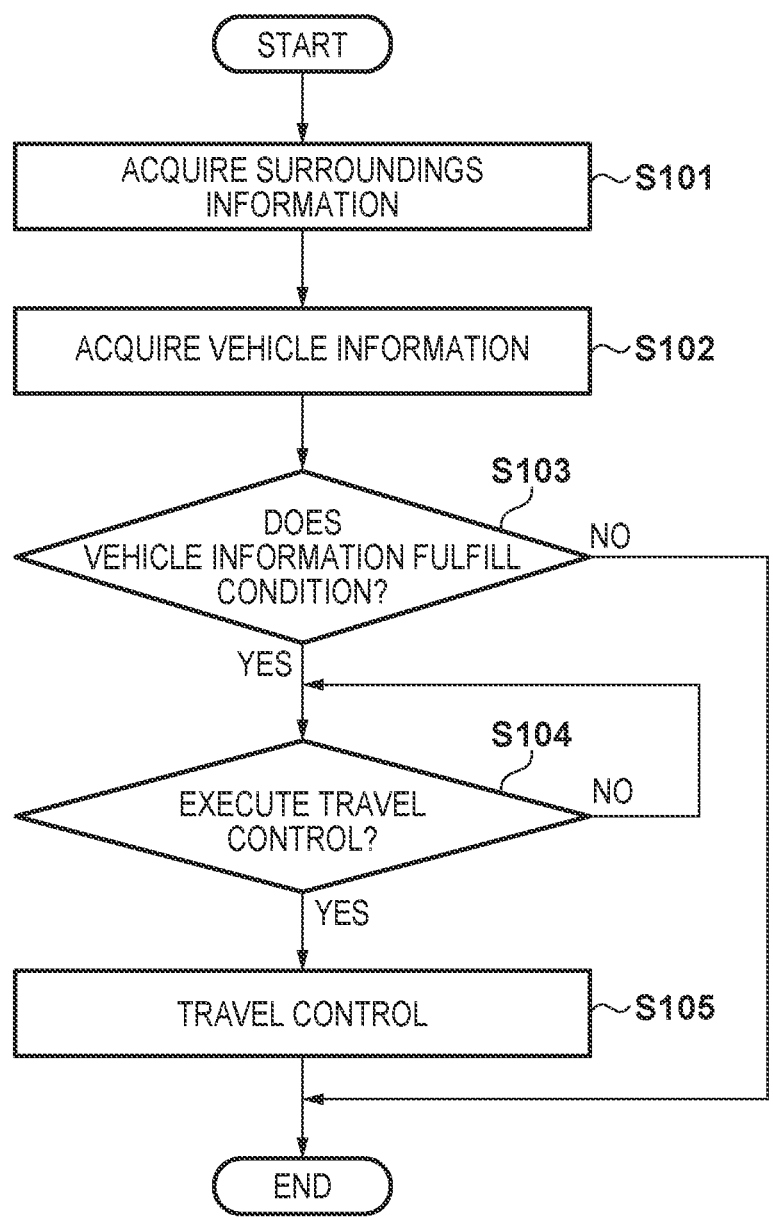
FIG. 4 is a flowchart illustrating processing in travel control of a vehicle.

FIG. 4 is a flowchart illustrating processing in travel control of the vehicle 1 in the present embodiment. For example, the processing in FIG. 4 is realized by the ECUs constituting the controller 200. Furthermore, the processing in FIG. 4 is executed while the vehicle 1 is traveling. Also, the case in which the processing in FIG. 4 is executed envisions a scene in which the vehicle 1 and another vehicle traveling in the same direction as the self-vehicle in a different lane from the self-vehicle approach one another with the relative distance between the vehicles decreasing at a predetermined rate or more. Note that the relative distance between the self-vehicle and the other vehicle is the inter-vehicle distance extending along a driving lane.

In step S101, the controller 200 acquires the surroundings information. The processing in step S101 is not only executed at a predetermined timing, but rather, if the vehicle 1 is in an automated driving state, action plans of the vehicle 1 are executed while surroundings information, which is image information regarding white lines, for example is being obtained. In step S102, the controller 200 acquires vehicle information regarding another vehicle traveling in the same direction as the vehicle 1 in a different lane from the vehicle 1. Here, the other vehicle is the other vehicle 302 or 304 described in FIG. 3. For example, the controller 200 acquires information regarding the other vehicle via the communication device 25a. Alternatively, the controller 200 acquires information regarding the other vehicle by using the surroundings recognition cameras 207 and the surroundings recognition sensors 208, for example. The controller 200 acquires the travel-direction vehicle body length, the vehicle height, and the width of the other vehicle, for example, as the information regarding the other vehicle. Furthermore, if the surroundings recognition cameras 207 are used, a configuration may be employed in which, by using an algorithm used as artificial intelligence or a predetermined algorithm, a vehicle in an image is directly recognized as being a truck or a bus, based on feature points (for example, the loading deck portion, the number of tires, and the height-to-width ratio) of the vehicle, and in that case, it is recognized that the vehicle information fulfills a predetermined condition. If the controller 200 acquires the information regarding the other vehicle via the communication device 25a, the controller 200 may acquire information regarding the vehicle model, etc., provided that the above-described dimensions of the other vehicle can be determined. Furthermore, a configuration may be employed in which, in step S102, information regarding the other vehicle is acquired in the order of priority. For example, a configuration is employed in which the controller 200 first acquires the travel-direction vehicle body length of the other vehicle. If the vehicle body length cannot be acquired, the controller 200 acquires the vehicle height of the other vehicle. Then, the controller 200 estimates the vehicle body length from the vehicle height. For example, the controller 200 may hold information regarding combinations of vehicle height and vehicle body length for a plurality of predetermined vehicle models in advance in a storage region, and may specify the vehicle body length corresponding to the closest-matching vehicle height in the information held, based on the information regarding vehicle height acquired by the surroundings recognition cameras 207 or the surroundings recognition sensors 208.

In step S103, the controller 200 determines whether or not the vehicle information acquired in step S102 fulfills a condition. For example, the controller 200 determines whether or not the vehicle height of the other vehicle is a predetermined height or more. That is, in step S103, a determination is made as to whether or not the other vehicle is a large-sized vehicle for which travel control in the present embodiment should be executed. Processing proceeds to step S104 if it is determined in step S103 that the vehicle information fulfills the condition. On the other hand, if it is determined in step S103 that the vehicle information does not fulfill the condition, the processing in FIG. 4 is terminated without executing the travel control in the present embodiment.

In step S104, the controller 200 monitors for a timing to execute the travel control in a later stage. For example, the controller 200 decides to execute travel control if the controller 200 determines that the vehicle 1 and the other vehicle have approached one another to an extent where the distance between the vehicles is within a predetermined distance. Furthermore, the controller 200 decides to execute travel control if the controller 200 detects the deceleration of the other vehicle, for example. If the other vehicle, which is a large-sized vehicle, makes a right or left turn, the other vehicle decelerates and a change such as a decrease in the distance between the other vehicle and the constantly-traveling vehicle 1 can be recognized. In the present embodiment, the decision to execute travel control is made when such a change is recognized. Processing proceeds to step S105 if a decision to execute travel control is made in step S104.

In step S105, the controller 200 executes travel control for safely avoiding side-by-side travel with the other vehicle without causing fear to those on board the vehicle. Here, side-by-side travel with the other vehicle refers to a state in which at least a part of the self-vehicle overlaps with the other vehicle in a direction perpendicular to the travel direction. In step S105, the controller 200 executes travel control such that a predetermined relative distance is secured from the rear end of the other vehicle along a lane, so that the braking amount that would be necessitated by a change in behavior (swinging of the traveling path, etc.) of the other vehicle is a predetermined value or less. As was described in FIG. 3, it is highly likely that the other vehicle, when making a right or left turn, will intrude into the lane that the self-vehicle is in, due to a temporary swing in the traveling path in the direction opposite the direction of the turn the other vehicle is making. In the present embodiment, by taking such a likelihood into consideration and performing travel control for decelerating the vehicle 1 and avoiding side-by-side travel with the other vehicle in accordance with the state of approach of the self-vehicle to the other vehicle, a situation such as the application of hard braking when the other vehicle makes a right or left turn can be prevented.

Figure 5:
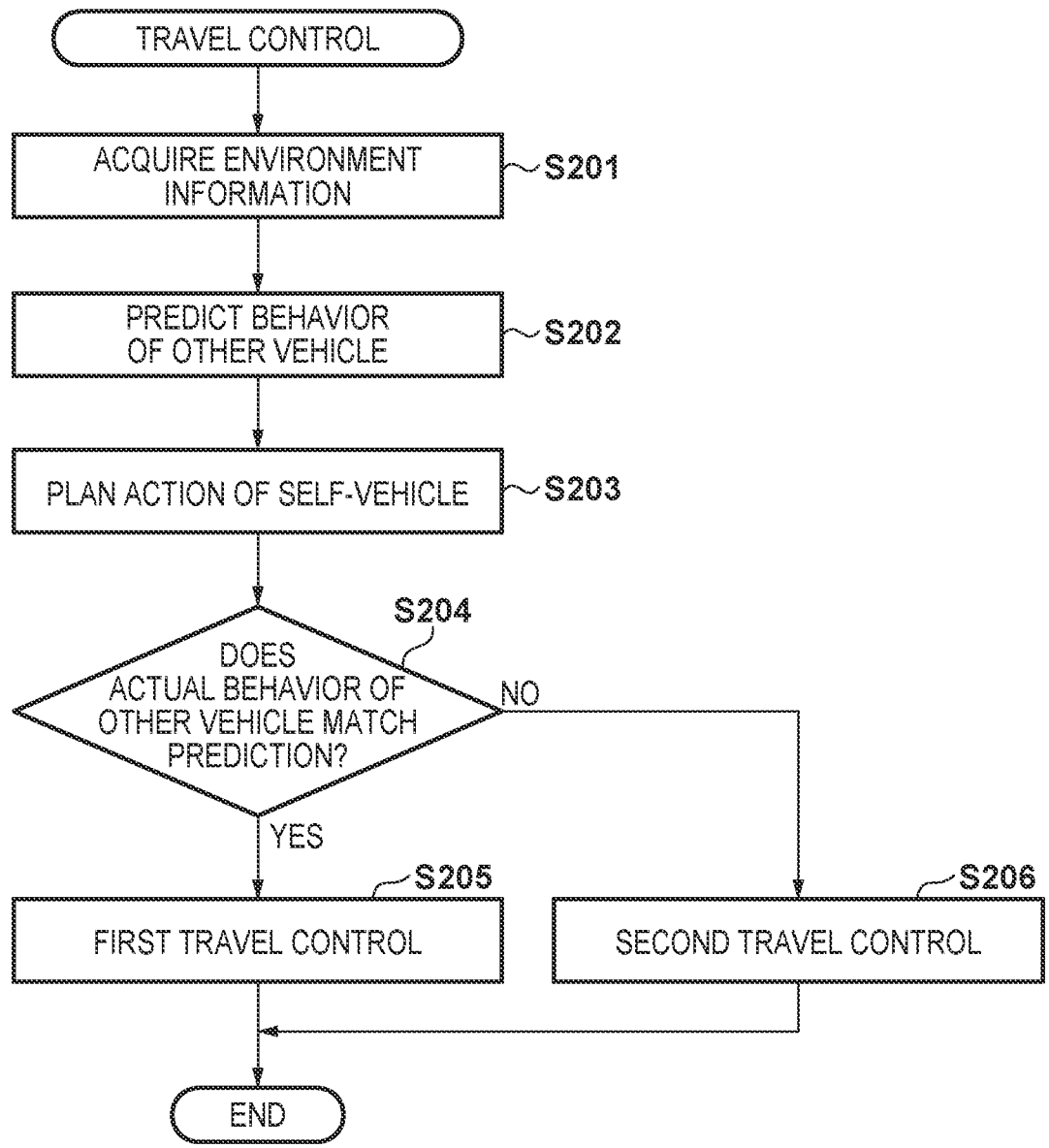
FIG. 5 is a flowchart illustrating processing in travel control in step S105.

FIG. 5 is a flowchart illustrating processing in travel control in step S105 in FIG. 4. In step S201, the controller 200 acquires environment information. Here, the environment information is information regarding a road that the other vehicle is making a right or left turn into, and for example is the intersecting angle of intersecting roads. Among intersections, there are intersections, such as that illustrated on the left side of FIG. 3, at which roads substantially perpendicularly intersect and intersections, such as that illustrated in FIG. 11, at which the turning angle when making a left turn is 90 degrees or more. In step S201, the controller 200 acquires environment information such as that described above from the map information and the traffic information, for example.

Figure 11:
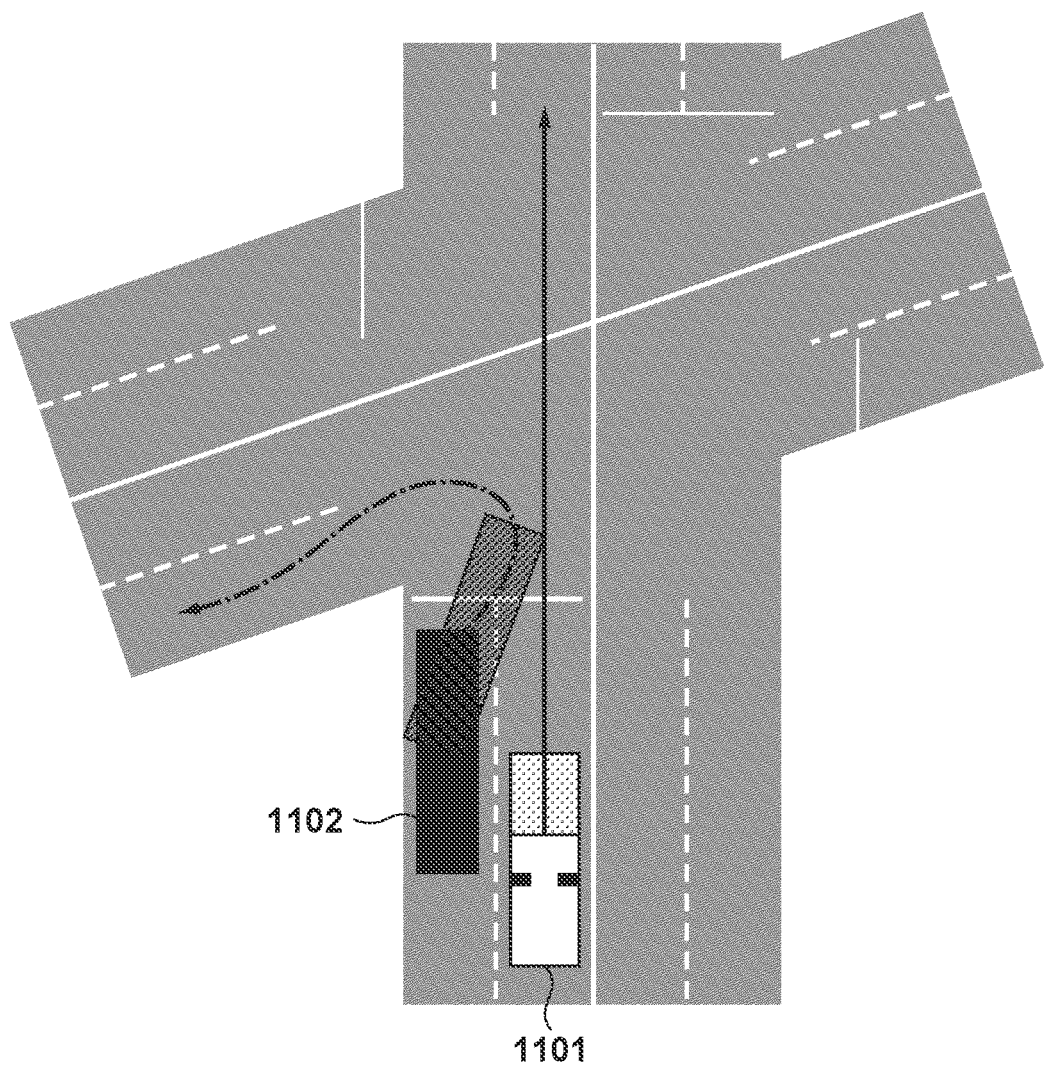
FIG. 11 is a diagram illustrating another vehicle making a left turn.

Next, in step S202, the controller 200 predicts the behavior of the other vehicle based on the environment information acquired in step S201. For example, the controller 200 predicts the travel course of the other vehicle based on the travel-direction vehicle body length of the other vehicle and the intersecting angle. The dotted arrows in FIG. 3 and FIG. 11 are examples of predicted travel courses of other vehicles. Given the same vehicle body length, the degree of intrusion into the lane that the self-vehicle is in would be greater in the case in FIG. 11 than in the case in FIG. 3.

In step S203, the controller 200 plans an action of the vehicle 1 based on the behavior of the other vehicle predicted in step S202. Because the speed of other vehicles when making right and left turns is low and can be regarded as being substantially the same, the controller 200 calculates the time it will take for the other vehicle to complete a right or left turn based on the travel course predicted in step S202. Further, based on the calculated time and the distance between the other vehicle and the vehicle 1 at the current point in time, the controller 200 plans deceleration of the vehicle 1 so that the vehicle 1 does not approach the other vehicle to be within a predetermined distance from the other vehicle until the other vehicle completes the right or left turn.

In step S204, the controller 200 determines whether or not the actual behavior of the other vehicle matches the behavior predicted in step S202. Here, if it is determined that the actual behavior matches the predicted behavior, the controller 200, in step S205, controls travel of the vehicle 1 in accordance with the action planned in step S203 (first travel control). On the other hand, if it is determined that the actual behavior does not match the predicted behavior, processing proceeds to step S206. For example, the actual behavior does not match the predicted behavior in a case in which the other vehicle 302 travels straight ahead on the left side of FIG. 3. In such a case, the controller 200, in step S206, controls the steering and the acceleration/deceleration of the vehicle 1 while acquiring the surroundings information, regardless of the action planned in step S203 (second travel control). After steps S205 and S206, the processing in FIG. 5 is terminated.

Thus, according to the present embodiment, if the other vehicle is a large-sized vehicle, decelerated travel is performed taking into consideration the temporary swing in travel course occurring when the other vehicle makes a right or left turn. As a result of this, a situation in which hard braking is applied due to the other vehicle intruding into the lane that the self-vehicle is in is avoided, and thus, the vehicle body can be controlled without causing fear to those on board the vehicle. Furthermore, the deceleration of the self-vehicle can be planned appropriately because the control amount of the self-vehicle is changed in accordance with a travel course predicted based on the size of the other vehicle.

Figure 6:
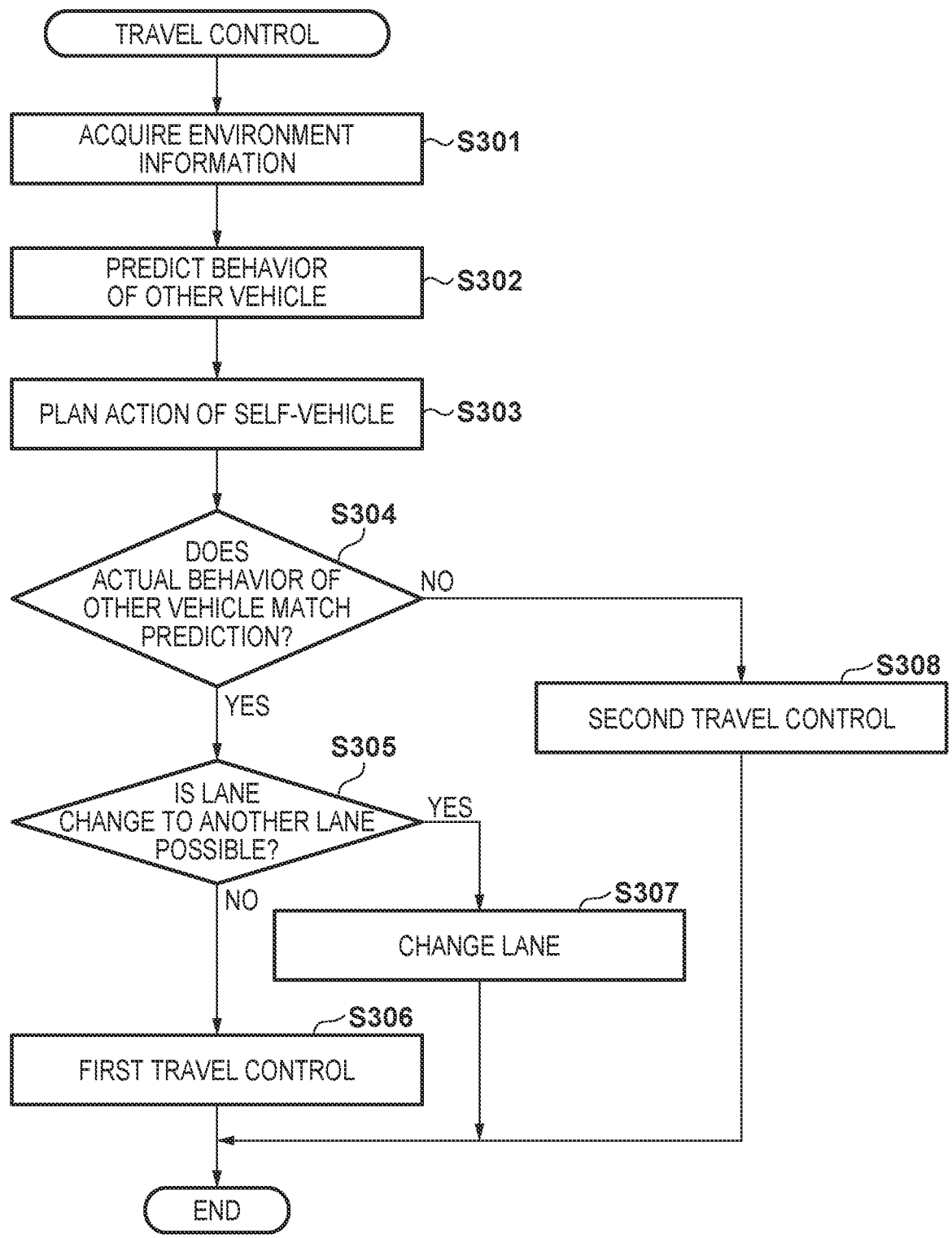
FIG. 6 is another flowchart illustrating processing in travel control in step S105.

FIG. 6 is another flowchart illustrating processing in travel control in step S105 in FIG. 4. Description of the processing in steps S301 to S304 and step S308 in FIG. 6 is omitted due to being the same as the description of the processing in steps S201 to S204 and step S206 in FIG. 5. In FIG. 6, processing proceeds to step S305 if it is determined in step S304 that the actual behavior matches the prediction, and the controller 200 determines whether or not a lane change to another lane is possible. Here, the other lane is a lane on the opposite side from the lane that the other vehicle is present in. For example, if the self-vehicle is traveling in the center lane of three lanes and the other vehicle is traveling in the left lane, the other lane is the right lane. The other lane is the left lane if the other vehicle is traveling in the right lane. If it is determined in step S305 that a lane change is not possible, first travel control similar to that in step S205 in FIG. 5 is executed in step S306. On the other hand, if it is determined in step S305 that a lane change is possible, the controller 200 executes the lane change in step S307.

Risks brought about by the other vehicle making a right or left turn can be mitigated even more by employing a configuration in which a lane change is performed if possible, as illustrated in FIG. 6.

Figure 7:
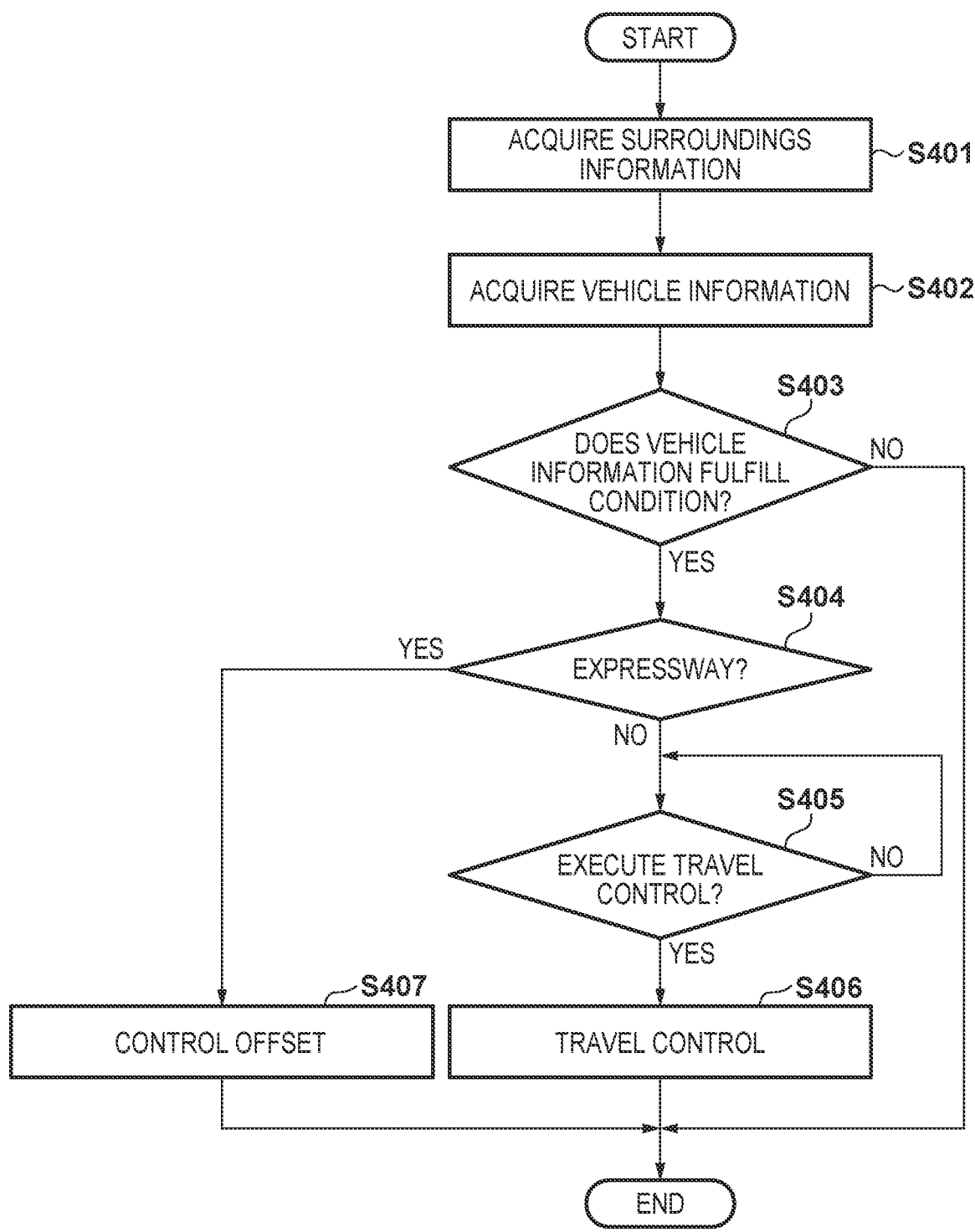
FIG. 7 is another flowchart illustrating processing in travel control of a vehicle.

FIG. 7 is another flowchart illustrating processing in travel control of the vehicle 1. Description of the processing in steps S401 to S403, S405, and S406 in FIG. 7 is omitted due to being the same as the description of the processing in steps S101 to S103, S104, and S105 in FIG. 4. In FIG. 7, if it is determined in step S403 that the vehicle information fulfills the condition, the controller 200, in step S404, determines whether or not the current driving scene of the vehicle 1 is an expressway, based on the map information and the traffic information, for example. If it is determined that the scene is not an expressway, processing proceeds to step S405 and travel control is executed as described in FIG. 4. On the other hand, if it is determined that the scene is an expressway, the controller 200, in step S407, performs offset control (toward the laterally opposite side from the other vehicle) so that the vehicle moves away from the other vehicle in the vehicle width direction, without executing the deceleration control as described in FIG. 4.

As illustrated in FIG. 7, unnecessary deceleration of the self-vehicle is not executed because, on an expressway, it is not necessary to take into consideration the possibility of the other vehicle making a right or left turn. As a result of this, a safety margin can be secured by securing a vehicle width direction distance from large-sized vehicles, while keeping travel on an expressway smooth.

Figure 8:
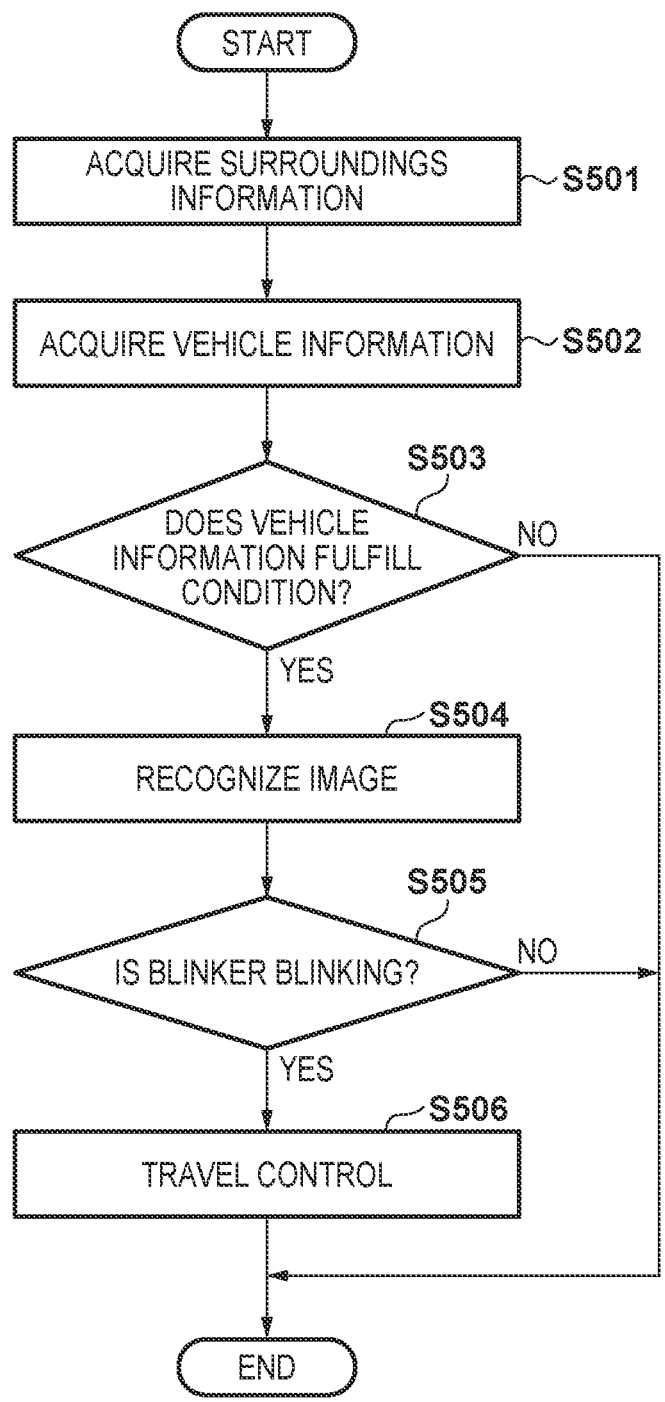
FIG. 8 is another flowchart illustrating processing in travel control of a vehicle.

FIG. 8 is another flowchart illustrating processing in travel control of the vehicle 1. Description of the processing in steps S501 to S503 and step S506 in FIG. 8 is omitted due to being the same as the description of the processing in steps S101 to S103 and step S105 in FIG. 4. In FIG. 8, if it is determined in step S503 that the condition is fulfilled, the controller 200, in step S504, performs image recognition based on images taken by the surroundings recognition cameras 207. Then, as a result of the recognition in step S504, the controller 200, in step S505, determines whether or not a direction indicator (blinker) of the other vehicle is blinking. Here, if it is determined that a blinker of the other vehicle is blinking, processing proceeds to step S506 and travel control is executed as described in FIG. 4. On the other hand, if it is determined that the blinkers are not blinking, the processing in FIG. 8 is terminated.

According to the processing in FIG. 8, travel control can be executed based on a clear indication that the other vehicle will make a right or left turn. Furthermore, a configuration may be employed in which the flashing of a hazard light is determined in step S505. If it is determined that a hazard light is flashing, processing proceeds to step S506 and travel control is executed as described using FIG. 4. With such a configuration, the presence, forward of the other vehicle, of an obstacle that would obstruct travel can be indirectly confirmed, and the necessity to perform processing for avoiding unexpected risks when travel control is executed following an action plan of the self-vehicle can be reduced, unexpected risks including something jumping out from the other-vehicle side when traveling side by side with the other vehicle.

Figure 9:
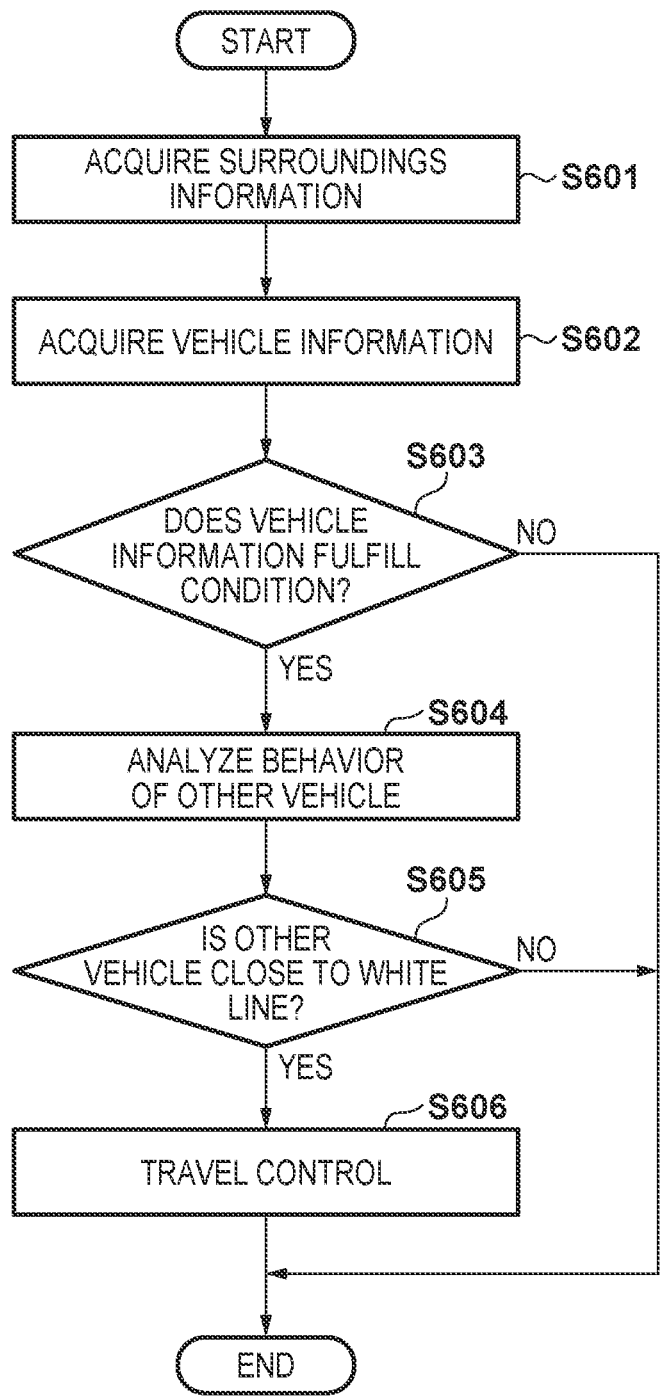
FIG. 9 is another flowchart illustrating processing in travel control of a vehicle.

FIG. 9 is another flowchart illustrating processing in travel control of the vehicle 1. Description of the processing in steps S601 to S603 and step S606 in FIG. 9 is omitted due to being the same as the description of the processing in steps S101 to S103 and step S105 in FIG. 4. In FIG. 9, if it is determined in step S603 that the vehicle information fulfills the condition, the controller 200, in step S604, analyzes the behavior of the other vehicle based on the recognition results of the surroundings recognition cameras 207 and the surroundings recognition sensors 208. Here, the controller 200 analyzes the degree of approach of the other vehicle to the white line serving as the boundary with the lane in which the vehicle 1 is traveling, for example. Then, in step S605, the controller 200 determines whether or not the other vehicle is close to the white line. Here, if it is determined that the other vehicle is close to the white line, processing proceeds to step S606 and travel control is executed as described in FIG. 4. Note that the controller 200 sets a greater braking amount for the deceleration of the vehicle 1 in step S606 than the braking amount in step S105 in FIG. 4. With such a configuration, the braking amount of the self-vehicle can be increased even more upon recognizing a behavior where it is highly likely that the other vehicle will cross over the white line and approach the self-vehicle. On the other hand, if it is determined that the other vehicle is not close to the white line, the processing in FIG. 9 is terminated.

As illustrated in FIG. 9, travel control is executed if it is determined that the other vehicle is close to the white line. Cases in which another vehicle intrudes into the lane that the self-vehicle is in are not necessarily limited to cases in which the other vehicle makes a right or left turn, and there also may be cases in which such a circumstance is brought about due to an unexpected operation made by the driver of the other vehicle. According to the processing in FIG. 9, sudden risks can be mitigated even in cases in which the other vehicle does not make a right or left turn, because the action of the self-vehicle is planned and deceleration control is executed based on the behavior of the other vehicle. Furthermore, a configuration may be employed in which, if unsteadiness in the behavior of the other vehicle is recognized as a result of the analysis in step S604, the deceleration of the vehicle 1 is planned with a distance longer than the predetermined distance described in step S203 adopted as the predetermined distance in step S606.

Figure 10:
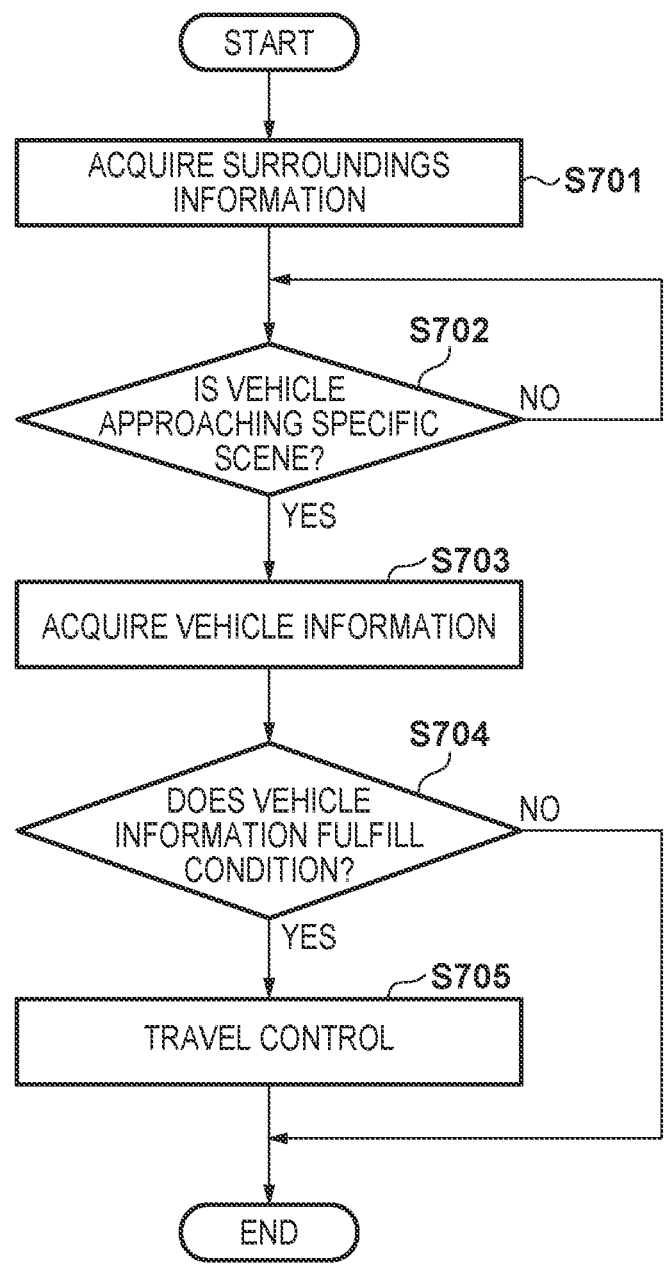
FIG. 10 is another flowchart illustrating processing in travel control of a vehicle.

FIG. 10 is another flowchart illustrating processing in travel control of the vehicle 1. Description of the processing in steps S701, S703, S704, and S705 in FIG. 10 is omitted due to being the same as the description of the processing in steps S101, S102, S103, and S105 in FIG. 4. In FIG. 10, upon acquiring the surroundings information in step S701, in step S702, the controller 200 monitors, based on the map information and the traffic information for example, whether or not the vehicle 1 is approaching a specific scene. Here, the specific scene is an intersection or a T-junction, for example. If it is determined that the vehicle 1 is approaching a specific scene, processing proceeds to step S703 and the controller 200 acquires vehicle information regarding another vehicle traveling in a different lane from the lane that the vehicle 1 is in, as described in FIG. 4.

As illustrated in FIG. 10, if it is recognized that the vehicle 1 is approaching the specific scene, travel control is executed without executing the determination in step S104 of whether or not to execute travel control. For example, most vehicles, including large-sized vehicles, tend to decelerate when approaching an intersection. Accordingly, in cases in which the vehicle 1 approaches a specific scene, the efficiency of processing until travel control is executed can be improved even more.

Summary of The Embodiment

A travel control device in the above-described embodiment includes: a control unit configured to control travel of a vehicle (controller 200); a first acquisition unit configured to acquire information regarding the surroundings of the vehicle (step S101, controller 200, surroundings recognition cameras 207, surroundings recognition sensors 208); and a second acquisition unit configured to acquire vehicle information regarding another vehicle traveling in the same direction as the vehicle in a different lane from the lane that the vehicle is traveling in with at least a part of the other vehicle forward of the vehicle, the vehicle information regarding the other vehicle being included in the information regarding the surroundings of the vehicle acquired by the first acquisition unit (step S102, controller 200), wherein if the vehicle information regarding the other vehicle fulfills a condition, the control unit, in accordance with a state of approach of the vehicle to the other vehicle, performs control so that the vehicle decelerates (FIG. 4).

With such a configuration, risks brought about by the other vehicle intruding into the lane that the self-vehicle is in due to the other vehicle making a right or left turn can be avoided, by decelerating the self-vehicle and avoiding side-by-side travel if the other vehicle decelerates and approaches the self-vehicle to be within a predetermined distance therewith, for example.

Furthermore, if the control unit recognizes that the vehicle is not traveling on an expressway and the vehicle information regarding the other vehicle fulfills the condition, the control unit, in accordance with the state of approach of the vehicle to the other vehicle, performs control so that the vehicle decelerates (FIG. 7). With such a configuration, it is possible to decelerate the self-vehicle and avoid side-by-side travel with the other vehicle if the self-vehicle is not traveling on an expressway.

Furthermore, if the control unit recognizes that the vehicle is traveling on the expressway and the vehicle information regarding the other vehicle fulfills the condition, the control unit, in accordance with the state of approach of the vehicle to the other vehicle, executes offset control in a width-direction of the vehicle toward a laterally opposite side from the other vehicle (FIG. 7). Furthermore, when the condition of approach to the other vehicle is such that a relative distance between the other vehicle and the vehicle along a lane is decreasing at a predetermined rate or more, the control unit controls a target speed of the vehicle and performs deceleration. Furthermore, if the control unit recognizes that the vehicle is traveling on the expressway and the vehicle information regarding the other vehicle fulfills the condition, the control unit does not decelerate the vehicle (FIG. 7). With such a configuration, because the deceleration control is not performed and the offset control is executed if the self-vehicle is traveling on an expressway, the risks brought about by the other vehicle intruding into the lane that the self-vehicle is in due to the other vehicle making a right or left turn can be avoided without obstructing the traffic of vehicles on the expressway.

Furthermore, a travel control device in the above-described embodiment includes: a control unit configured to control travel of a vehicle (controller 200); a first acquisition unit configured to acquire information regarding the surroundings of the vehicle (step S101, controller 200, surroundings recognition cameras 207, surroundings recognition sensors 208); and a second acquisition unit configured to acquire vehicle information regarding another vehicle traveling in the same direction as the vehicle in a different lane from the lane that the vehicle is traveling in with at least a part of the other vehicle forward of the vehicle if it is determined based on the information regarding the surroundings of the vehicle that the vehicle is approaching a specific scene, the vehicle information regarding the other vehicle being included in the information regarding the surroundings of the vehicle acquired by the first acquisition unit (step S703, controller 200), wherein if the vehicle information regarding the other vehicle fulfills a condition, the control unit performs control so that the vehicle decelerates (FIG. 10). Furthermore, the specific scene is an intersection.

With such a configuration, risks brought about by the other vehicle intruding into the lane that the self-vehicle is in due to the other vehicle making a right or left turn can be avoided, by decelerating the self-vehicle and avoiding side-by-side travel if the self-vehicle approaches an intersection, for example.

Furthermore, a travel control device in the above-described embodiment includes: a control unit configured to control travel of a vehicle (controller 200); a first acquisition unit configured to acquire information regarding the surroundings of the vehicle (step S101, controller 200, surroundings recognition cameras 207, surroundings recognition sensors 208); a second acquisition unit configured to acquire vehicle information regarding another vehicle traveling in the same direction as the vehicle in a different lane from the lane that the vehicle is traveling in with at least a part of the other vehicle forward of the vehicle, the vehicle information regarding the other vehicle being included in the information regarding the surroundings of the vehicle acquired by the first acquisition unit (step S502, step S602, controller 200); and a recognition unit configured to perform recognition with respect to an image of the other vehicle (step S504, step S604, controller 200), wherein if the vehicle information regarding the other vehicle fulfills a condition, the control unit, based on the result of the recognition by the recognition unit, performs control so that the vehicle performs deceleration (FIG. 8, FIG. 9).

With such a configuration, risks brought about by the other vehicle intruding into the lane that the self-vehicle is in due to the other vehicle making a right or left turn can be avoided, by decelerating the self-vehicle and avoiding side-by-side travel based on the recognition result of an image of the other vehicle.

Furthermore, the control unit decelerates the vehicle if the recognition unit recognizes blinking of a direction indicator of the other vehicle (FIG. 8). With such a configuration, risks brought about by the other vehicle intruding into the lane that the self-vehicle is in due to the other vehicle making a right or left turn can be avoided, by decelerating the self-vehicle and avoiding side-by-side travel if blinking of a direction indicator of the other vehicle is recognized.

Furthermore, if the recognition unit recognizes that the other vehicle is close to a white line demarcating the lane that the vehicle is traveling in and the different lane, the control unit controls the vehicle so that the vehicle decelerates by a second braking amount that is greater than a braking amount in the deceleration (FIG. 9). With such a configuration, risks brought about by the other vehicle intruding into the lane that the self-vehicle is in due to the other vehicle making a right or left turn can be avoided, by decelerating the self-vehicle and avoiding side-by-side travel if it is recognized that the other vehicle is close to the white line.

Furthermore, the first acquisition unit acquires the information regarding the surroundings of the vehicle by using at least one of a camera and a sensor (surroundings recognition cameras 207, surroundings recognition sensors 208). Furthermore, the first acquisition unit acquires the information regarding the surroundings of the vehicle through inter-vehicular communication (ECU 25). Furthermore, the vehicle information regarding the other vehicle includes at least one of a vehicle height, a width, and a travel-direction length of the other vehicle. With such a configuration, the vehicle height and/or the travel direction vehicle body length of the other vehicle can be acquired by using a camera, by using a sensor, and/or through inter-vehicular communication.

Furthermore, the second acquisition unit acquires the vehicle height of the other vehicle if the travel-direction length of the other vehicle cannot be acquired, and the travel control device further includes an estimation unit configured to estimate the travel-direction length of the other vehicle based on the acquired vehicle height. With such a configuration, the travel-direction vehicle body length can be acquired from the vehicle height.

Furthermore, the condition is that the length indicated by the vehicle information regarding the other vehicle is a predetermined length or more. Furthermore, the control unit changes a control amount in accordance with the vehicle information regarding the other vehicle (step S205, step S306). With such a configuration, the deceleration amount can be changed in accordance with the travel-direction vehicle body length.

Furthermore, the control unit performs control so as to decelerate the vehicle so that the vehicle does not travel side by side with the other vehicle. With such a configuration, risks brought about by the other vehicle intruding into the lane that the self-vehicle is in due to the other vehicle making a right or left turn can be avoided because control is performed so that side-by-side travel with the other vehicle is avoided.

The invention is not limited to the foregoing embodiment, and various variations/changes are possible within the spirit of the invention.

What is claimed is:

1. A travel control device comprising:
at least one processor circuit with a memory comprising instructions, that when executed by the processor circuit, causes the at least one processor circuit to at least:
control travel of a vehicle;
acquire information regarding the surroundings of the vehicle; and
acquire vehicle information regarding another vehicle traveling in a first lane in a same direction as the vehicle traveling in a second lane with at least a part of the other vehicle forward of the vehicle, the vehicle information regarding the other vehicle being included in the information acquired regarding the surroundings of the vehicle, wherein, if the vehicle information regarding the other vehicle fulfills a condition, in accordance with a state of approach of the vehicle to the other vehicle, control is performed so that the vehicle decelerates, wherein the vehicle information regarding the other vehicle includes at least one of a vehicle height and a travel-direction length of the other vehicle, wherein the vehicle height of the other vehicle is acquired if the travel-direction length of the other vehicle cannot be acquired, and wherein the instructions, that when executed by the processor circuit, further cause the at least one processor circuit to at least estimate the travel-direction length of the other vehicle based on the acquired vehicle height.

2. The travel control device according to claim 1, wherein, if it is recognized that the vehicle is not traveling on an expressway and the vehicle information regarding the other vehicle fulfills the condition, then in accordance with the state of approach of the vehicle to the other vehicle, control is performed so that the vehicle decelerates.

3. The travel control device according to claim 2, wherein, if it is recognized that the vehicle is traveling on the expressway and the vehicle information regarding the other vehicle fulfills the condition, then in accordance with the state of approach of the vehicle to the other vehicle, offset control is executed in a width-direction of the vehicle toward a laterally opposite side from the other vehicle.

4. The travel control device according to claim 3, wherein, if it is recognized that the vehicle is traveling on the expressway and the vehicle information regarding the other vehicle fulfills the condition, the vehicle is not decelerated.

5. The travel control device according to claim 1, wherein, when the condition of approach to the other vehicle is such that a relative distance between the other vehicle and the vehicle along a lane is decreasing at a predetermined rate or more, a target speed of the vehicle is controlled and a deceleration is performed.

6. The travel control device according to claim 1, wherein the information regarding the surroundings of the vehicle is acquired by using at least one of a camera and a sensor.

7. The travel control device according to claim 1, wherein the information regarding the surroundings of the vehicle is acquired through inter-vehicular communication.

8. The travel control device according to claim 1, wherein the vehicle information regarding the other vehicle further includes a width of the other vehicle.

9. The travel control device according to claim 1, wherein the condition is that the length indicated by the vehicle information regarding the other vehicle is a predetermined length or more.

10. The travel control device according to claim 1, wherein a control amount is changed in accordance with the vehicle information regarding the other vehicle.

11. The travel control device according to claim 1, wherein control is performed so as to decelerate the vehicle so that the vehicle does not travel side by side with the other vehicle.

12. A travel control device comprising:
at least one processor circuit with a memory comprising instructions, that when executed by the processor circuit, causes the at least one processor circuit to at least:
control travel of a vehicle;
acquire information regarding the surroundings of the vehicle; and
acquire vehicle information regarding another vehicle traveling in a first lane in a same direction as the vehicle traveling in a second lane with at least a part of the other vehicle forward of the vehicle if it is determined based on the information regarding the surroundings of the vehicle that the vehicle is approaching a specific scene, the vehicle information regarding the other vehicle being included in the information acquired regarding the surroundings of the vehicle, wherein, if the vehicle information regarding the other vehicle fulfills a condition, control is performed so that the vehicle decelerates, wherein the vehicle information regarding the other vehicle includes at least one of a vehicle height and a travel-direction length of the other vehicle, wherein the vehicle height of the other vehicle is acquired if the travel-direction length of the other vehicle cannot be acquired, and wherein the instructions, that when executed by the processor circuit, further cause the at least one processor circuit to at least estimate the travel-direction length of the other vehicle based on the acquired vehicle height.

13. The travel control device according to claim 12, wherein the specific scene is an intersection.

14. A travel control device comprising:
at least one processor circuit with a memory comprising instructions, that when executed by the processor circuit, causes the at least one processor circuit to at least:
control travel of a vehicle;
acquire information regarding the surroundings of the vehicle;
acquire vehicle information regarding another vehicle traveling in a first lane in a same direction as the vehicle traveling in a second lane with at least a part of the other vehicle forward of the vehicle, the vehicle information regarding the other vehicle being included in the information acquired regarding the surroundings of the vehicle; and
perform recognition with respect to an image of the other vehicle, wherein, if the vehicle information regarding the other vehicle fulfills a condition, then based on the result of the recognition with respect to the image of the other vehicle, control is performed so that the vehicle decelerates, wherein the vehicle information regarding the other vehicle includes at least one of a vehicle height and a travel-direction length of the other vehicle, wherein the vehicle height of the other vehicle is acquired if the travel-direction length of the other vehicle cannot be acquired, and wherein the instructions, that when executed by the processor circuit, further cause the at least one processor circuit to at least estimate the travel-direction length of the other vehicle based on the acquired vehicle height.

15. The travel control device according to claim 14, wherein the vehicle is decelerated if a blinking of a direction indicator of the other vehicle is recognized.

16. The travel control device according to claim 14,
wherein, if the other vehicle is recognized as being close to a white line demarcating the first lane from the second lane, the vehicle is controlled so that the vehicle decelerates by a second braking amount that is greater than a braking amount in the deceleration.

17. A travel control method for execution in a travel control device, the method comprising:
controlling travel of a vehicle;
first acquiring information regarding the surroundings of the vehicle; and
second acquiring vehicle information regarding another vehicle traveling in a first lane in a same direction as the vehicle traveling in a second lane with at least a part of the other vehicle forward of the vehicle, the vehicle information regarding the other vehicle being included in the information regarding the surroundings of the vehicle acquired in the first acquiring,
wherein, in the controlling, if the vehicle information regarding the other vehicle fulfills a condition, control is performed, in accordance with a state of approach of the vehicle to the other vehicle, so that the vehicle decelerates,
wherein the vehicle information regarding the other vehicle includes at least one of a vehicle height and a travel-direction length of the other vehicle,
wherein the vehicle height of the other vehicle is acquired if the travel-direction length of the other vehicle cannot be acquired, and
estimating the travel-direction length of the other vehicle based on the acquired vehicle height.

18. A travel control method for execution in a travel control device, the method comprising:
controlling travel of a vehicle;
first acquiring information regarding the surroundings of the vehicle; and
second acquiring vehicle information regarding another vehicle traveling in a first lane in a same direction as the vehicle traveling in a second lane with at least a part of the other vehicle forward of the vehicle if it is determined based on the information regarding the surroundings of the vehicle that the vehicle is approaching a specific scene, the vehicle information regarding the other vehicle being included in the information regarding the surroundings of the vehicle acquired in the first acquiring,
wherein, in the controlling, if the vehicle information regarding the other vehicle fulfills a condition, control is performed so that the vehicle decelerates,
wherein the vehicle information regarding the other vehicle includes at least one of a vehicle height and a travel-direction length of the other vehicle,
wherein the vehicle height of the other vehicle is acquired if the travel-direction length of the other vehicle cannot be acquired, and
estimating the travel-direction length of the other vehicle based on the acquired vehicle height.

19. A travel control method for execution in a travel control device, the method comprising:
controlling travel of a vehicle;
first acquiring information regarding the surroundings of the vehicle;
second acquiring vehicle information regarding another vehicle traveling in a first lane in a same direction as the vehicle traveling in a second lane with at least a part of the other vehicle forward of the vehicle, the vehicle information regarding the other vehicle being included in the information regarding the surroundings of the vehicle acquired in the first acquiring; and
performing recognition with respect to an image of the other vehicle,
wherein, in the controlling, if the vehicle information regarding the other vehicle fulfills a condition, control is performed, based on the result of the recognition, so that the vehicle performs deceleration;
wherein the vehicle information regarding the other vehicle includes at least one of a vehicle height and a travel-direction length of the other vehicle,
wherein the vehicle height of the other vehicle is acquired if the travel-direction length of the other vehicle cannot be acquired, and
estimating the travel-direction length of the other vehicle based on the acquired vehicle height.

20. A non-transitory computer-readable storage medium storing a program for causing a computer to execute:
control of travel of a vehicle;
first acquisition of information regarding the surroundings of the vehicle; and
second acquisition of vehicle information regarding another vehicle traveling in a first lane in a same direction as the vehicle traveling in a second lane with at least a part of the other vehicle forward of the vehicle, the vehicle information regarding the other vehicle being included in the information regarding the surroundings of the vehicle acquired in the first acquisition,
wherein, in the control, if the vehicle information regarding the other vehicle fulfills a condition, control is performed, in accordance with a state of approach of the vehicle to the other vehicle, so that the vehicle decelerates,
wherein the vehicle information regarding the other vehicle includes at least one of a vehicle height and a travel-direction length of the other vehicle,
wherein the vehicle height of the other vehicle is acquired if the travel-direction length of the other vehicle cannot be acquired, and
wherein the travel-direction length of the other vehicle is estimated based on the acquired vehicle height.

21. A non-transitory computer-readable storage medium storing a program for causing a computer to execute:
control of travel of a vehicle;
first acquisition of information regarding the surroundings of the vehicle; and
second acquisition of vehicle information regarding another vehicle traveling in a first lane in a same direction as the vehicle traveling in a second lane with at least a part of the other vehicle forward of the vehicle if it is determined based on the information regarding the surroundings of the vehicle that the vehicle is approaching a specific scene, the vehicle information regarding the other vehicle being included in the information regarding the surroundings of the vehicle acquired in the first acquisition,
wherein, in the control, if the vehicle information regarding the other vehicle fulfills a condition, control is performed so that the vehicle decelerates,
wherein the vehicle information regarding the other vehicle includes at least one of a vehicle height and a travel-direction length of the other vehicle,
wherein the vehicle height of the other vehicle is acquired if the travel-direction length of the other vehicle cannot be acquired, and the travel-direction length of the other vehicle is estimated based on the acquired vehicle height.

22. A non-transitory computer-readable storage medium storing a program for causing a computer to execute:
control of travel of a vehicle;
first acquisition of information regarding the surroundings of the vehicle;
second acquisition of vehicle information regarding another vehicle traveling in a first lane in a same direction as the vehicle traveling in a second lane with at least a part of the other vehicle forward of the vehicle, the vehicle information regarding the other vehicle being included in the information regarding the surroundings of the vehicle acquired in the first acquisition; and
recognition with respect to an image of the other vehicle,
wherein, in the control, if the vehicle information regarding the other vehicle fulfills a condition, control is performed, based on the result of the recognition, so that the vehicle performs deceleration,
wherein the vehicle information regarding the other vehicle includes at least one of a vehicle height and a travel-direction length of the other vehicle,
wherein the vehicle height of the other vehicle is acquired if the travel-direction length of the other vehicle cannot be acquired, and
the travel-direction length of the other vehicle is estimated based on the acquired vehicle height.

* * * * *